Sept. 4, 1934.    J. M. BOWMAN    1,972,758
DIAL INDICATOR
Filed March 21, 1931    2 Sheets-Sheet 1

Inventor:
John M. Bowman
by his Attorneys
Howson & Howson

Sept. 4, 1934.　　　J. M. BOWMAN　　　1,972,758
DIAL INDICATOR
Filed March 21, 1931　　　2 Sheets-Sheet 2
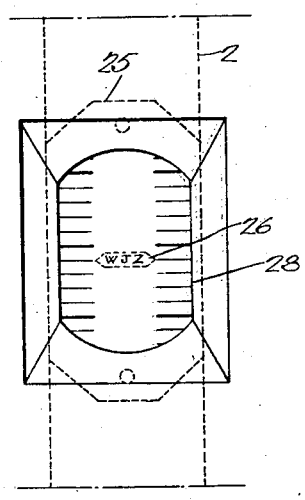
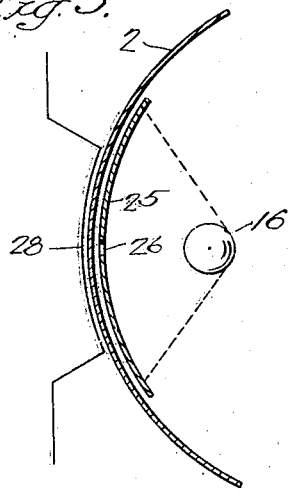
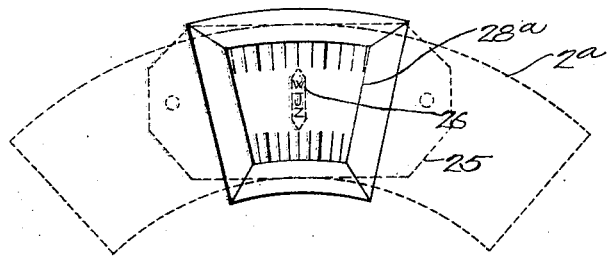
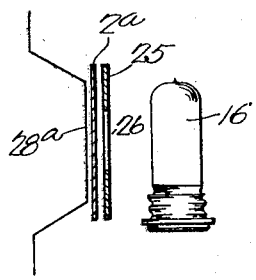
Inventor:
John M. Bowman
by his Attorneys
Howson & Howson Patented Sept. 4, 1934

1,972,758

UNITED STATES PATENT OFFICE 1,972,758

DIAL INDICATOR

John M. Bowman, Philadelphia, Pa., assignor to Philadelphia Storage Battery Company, Philadelphia, Pa., a corporation of Pennsylvania Application March 21, 1931, Serial No. 524,389

5 Claims. (Cl. 116—124.4)

This invention relates to position-indicating devices and particularly to such devices as are adapted to indicate the position of radio receiver dials or the like.

The general object of the invention is to provide a device of the class indicated which will be simple in construction and efficient in carrying out its intendend purpose.

A more specific object of the invention is to provide a device in which general illumination is provided over a desired portion of the indicating dial, and a bright spot or area in such illumination is produced to act as an indicating means for the dial setting.

A further object of the invention is to so design the device that the bright area produced is of proper shape to serve as an indicating means and also as a guide for facilitating the marking or logging of station call letters upon the dial.

In accordance with the invention, I provide a translucent, graduated dial, which, as usual, is mounted to rotate with the shaft of the variable or tuning condensers. I also provide a stationary light source behind the dial, and a stationary translucent screen with an opening therein between the dial and the light source. A desired portion of the dial is illuminated by the light from the source, and the light passing through the opening in the screen produces a bright area in the illuminated portion of the dial. The principles of the invention will be more clearly understood from the following detailed description and the accompanying drawings, which disclose specific embodiments of devices constructed in accordance with the invention.

Figure 1:
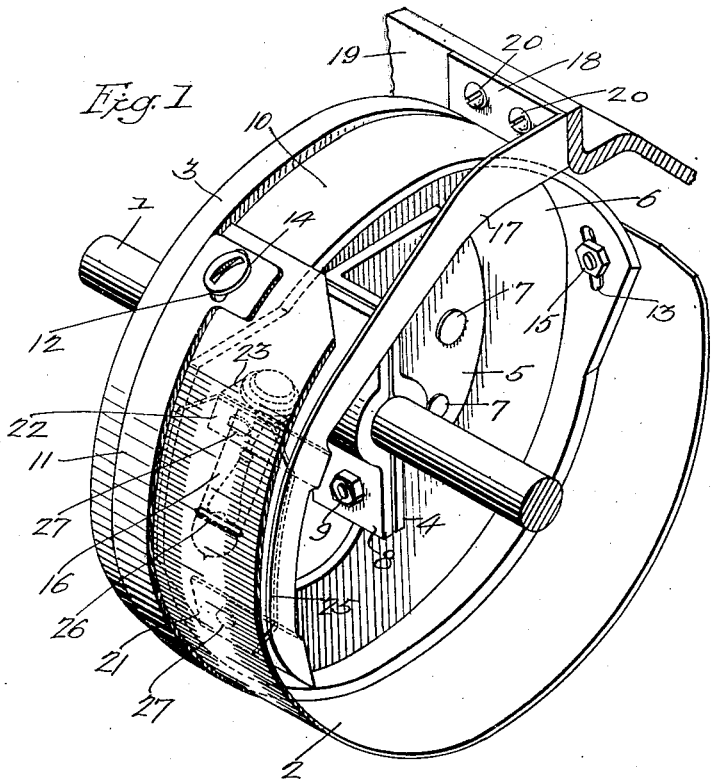
Fig. 1 is a perspective view of a dial position indicating assembly constructed in accordance with the invention.
Figure 2:
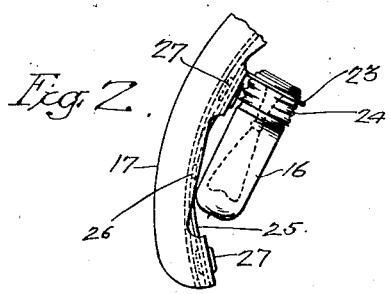
Fig. 2 is a detail view showing the mounting of the pilot light of the device of Fig. 1.

Figs. 4 and 5 are front and side diagrammatic views respectively of the essential elements of the device shown in Fig. 1 the purpose of these views being to illustrate clearly the relative positions of the elements and their manner of cooperation; and Figs. 6 and 7 are views similar to Figs. 4 and 5 of a modified form of the device.

Referring to the views of the drawings, and particularly to Figs. 1 to 5, there is shown a rotatable shaft 1 which may be the shaft upon which the rotating plates of the variable or tuning condensers of a radio receiver are mounted. As is customary and now well understood, a plurality of such condensers may have their rotatable plates mounted upon a common shaft, which may be driven in any conventional manner and controlled by a single knob to provide the usual single control gang arrangement of condensers. For the purpose of mounting a suitable translucent graduated scale or dial 2 upon the rotatable shaft, I provide a cylindrical drum 3 which may be partially open at one end and entirely open at the other. A clamp 4 is centrally shaped to firmly embrace shaft 1, and is provided with a right-angle integral foot portion 5. The foot portion is adapted to rest against the end wall 6 of drum 3, and is firmly secured thereto by means of a plurality of screws 7 or similar suitable fastening means. A second clamp 8 is also centrally shaped to embrace the shaft 1, and coacts with clamp 4 to firmly secure drum 3 upon the shaft. Suitable bolts 9 or the like may be used to securely attach the extending portions of the two clamps together. It will be apparent that by means of this construction, drum 3 may be adjustably mounted upon shaft 1 and is adapted to rotate therewith.

The circumferential surface of drum 3 is cut away over a substantial portion of the periphery, as clearly shown in Fig. 1, the purpose of which will be more clearly apparent hereinafter. The graduated dial 2 is such length that it extends around the cut away portion of the circumferential surface of drum 3, and its ends slightly overlap the extending surface 10. A fastening strip 11 of about the same length as the dial securely holds one edge of the dial against the drum, and a pair of slots 12 and 13 are provided in the ends of the fastening strip for the reception of attaching bolts 14 and 15. Similar slots may be provided in the drum, and the position of the dial on the drum may thus be readily adjusted as desired.

In accordance with the invention, the dial is composed of any suitable translucent material, such as celluloid or the like, preferably with a surface suitable for marking station names thereon. By having the drum 3 cut away, as described above, the dial may be securely attached to the drum along one edge and practically the entire width of the dial may constitute the graduated scale. It will be understood, of course, that the graduations on the dial may indicate frequencies in kilocycles or wave lengths in meters, as is customary.

A pilot light 16 is mounted directly behind a portion of the dial which it is desired to illuminate. It will be understood, of course, that in the modern receiver, such portion would be that adjacent the window in the cabinet. The lamp is mounted in a stationary manner, and its purpose is, of course, to illuminate the desired portion of the dial which is adjacent the window. In order to properly mount the pilot lamp in the desired position, I provide a supporting bracket 17, which may comprise a strip of metal having one end 18 bent and attached to a suitable supporting member 19 by means of screws 20 or the like. Supporting device 19 is only partially shown, but such device may comprise any suitable bracket attached to the rear wall or base of the receiver housing or cabinet. The body of bracket 17 extends partly around the rotatable assembly and adjacent thereto. The other end of the bracket is provided with integral bent fingers 21 and 22, the latter having in turn an integral bent portion 23. The socket 24 (see Fig. 2), into which the pilot lamp is adapted to be removably screwed, may be suitably mounted in an opening in extended portion 23 of the bracket. The mounting for the socket may comprise the usual insulating washers or bushing and a suitable fastening bolt, as is well known. It will be understood, of course, that portion 23 of the bracket is in such a plane that the pilot lamp will be disposed at the desired angle with respect to the indicating dial.

Figure 3:
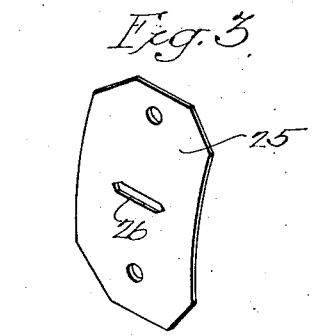
Fig. 3 is a detail view of the stationary translucent screen of the device.

In further accordance with the invention, I provide a sheet or screen 25 of translucent material, such as celluloid or the like. This screen is provided with a centrally disposed aperture 26, and is mounted between the dial and lamp upon the extending fingers 21 and 22 of the bracket by means of suitable rivets 27 or like fastening means. The relative positions of the essential elements are clearly shown in Figs. 4 and 5, wherein 28 represents the cabinet window. The screen is preferably shaped as shown in Fig. 3, and the centrally disposed opening therein is also shaped as shown. It will be noted that this opening is pointed at each end and that its horizontal edges are parallel.

Assuming that a radio receiver with which the device of the invention is associated is in operation, the light from the pilot lamp passing through both the translucent stationary screen and the dial will illuminate the desired portion of the dial in a subdued manner but sufficiently to make the graduations on the dial clearly visible. The intensity of the light passing through the centrally located aperture in the stationary screen, however, will be diminished only by passing through the dial, and as a result, a bright area of the size and shape of the aperture will be produced in the field of illumination on the dial. Since this bright area will be pointed at its ends, it will serve as a pointer to indicate the particular setting of the dial. Furthermore, if it is desired to mark or log call letters of stations to which one customarily listens upon the dial itself, the parallel horizontal edges of the bright area will serve as guide lines in making such markings, as clearly illustrated in Fig. 4. It is thus seen that in accordance with the principles of the invention, the bright spot produced in the center of the general field of illumination on the dial serves a two-fold purpose. The aperture may, of course, take any desired form and may be pointed at either or both of its ends.

In Figs. 6 and 7, the invention is applied to a modified type of receiver wherein the dial 2a takes the form of a sector of an annulus. In this case, the apertured screen 25 is disposed so that its aperture extends vertically to properly cooperate with the dial graduations. The elements function in the same manner as just described.

It is important to note that the desired area may be defined by a difference in color. In such case, instead of having an aperture in the stationary screen, it may be composed of materials of different colors. The body of the screen may be of one color while the central area having the shape of the aperture disclosed may be of a different color. Any colors may, of course, be used but it is desirable to choose those giving a sharp contrast.

From the above description and the accompanying disclosure, it will be apparent that a device constructed in accordance with the principles of the invention is composed of relatively few simple parts and is efficient in carrying out its intended function. Furthermore, the respective parts of the device may be made adjustable with respect to the rotatable condenser shaft and to each other, as illustrated in Fig. 1. Various changes in the details of construction may, of course, be made without departing from the spirit of the invention. Therefore, only such limitations as are imposed by the prior art, as reflected in the scope of the appended claims, are to be placed upon the invention.

I claim:

1. A dial indicator for radio receivers or the like, comprising a movable translucent dial upon which indicia may be inscribed, a stationary source of light, a stationary translucent screen arranged in the path of the rays of light from said source to said dial, said screen having an elongated area of different light transmitting characteristic from the remaining area of the screen, said elongated area being of substantial width and so disposed as to produce an image on said dial with which said indicia may be made coincide by moving said dial.

2. A dial indicator for radio receivers or the like, comprising a movable translucent dial, a stationary source of light, and a stationary translucent screen arranged in the path of the rays of light from said source to said dial, said screen having a centrally disposed elongated area of different light transmitting characteristic from the remaining area of the screen, said central area being of substantial width and having an indicating area of similar characteristic associated with an end thereof, whereby the sharply defined image of said central area produced on said dial may be used as a marking space for accurately inscribing indicia on said dial and the image of said indicating area serves as an indicator.

3. A dial indicator for radio receivers or the like, comprising a movable translucent dial having graduations thereon, a stationary source of light, and a stationary translucent screen arranged in the path of the rays of light from said source to said dial, said screen having a centrally disposed elongated area of different light transmitting characteristic from the remaining area of the screen, said central area being of substantial width and having an indicating area of similar characteristic associated with an end thereof adjacent said graduations, whereby the sharply defined image of said central area produced on said dial may be used as a marking space for accurately inscribing indicia on said dial and the image of said indicating area serves as an indicator.

4. A dial indicator for radio receivers or the like, comprising a movable translucent dial having graduations thereon, a stationary source of light, and a stationary translucent screen arranged in the path of the rays of light from said source to said dial, said screen having a centrally disposed enlongated aperture therein, said aperture being of substantial width and having an indicating apertured area associated with an end thereof adjacent said graduations, whereby the sharply defined image of said central aperture produced on said dial may be used as a marking space for accurately inscribing indicia on said dial and the image of said indicating area serves as an indicator.

5. A dial indicator for radio receivers or the like including a cabinet having a window opening therein through which a plurality of graduations on a dial may be viewed, a movable translucent dial having graduations thereon and upon which indicia may be inscribed located adjacent said window, a stationary source of light to one side of the dial, a stationary translucent screen positioned between the light source and dial and having a centrally disposed elongated aperture therein of substantial width and terminating in a point at one end whereby a beam of light having the area and configuration of the aperture but smaller than the window, is projected onto said dial within the area defined by the window, the boundary of the projected beam defining the area within which the indicia is inscribed.

JOHN M. BOWMAN.